United States Patent
Agarwala

(12) 
(10) Patent No.: US 7,596,725 B2
(45) Date of Patent: Sep. 29, 2009

(54) EFFICIENT TRACE TRIGGERING

(75) Inventor: Manisha Agarwala, Richardson, TX (US)

(73) Assignee: Texas Instruments Deutschland GmbH, Freising (DE)

( * ) Notice: Subject to any disclaimer, the term of this patent is extended or adjusted under 35 U.S.C. 154(b) by 427 days.

(21) Appl. No.: 11/420,914

(22) Filed: May 30, 2006

(65) Prior Publication Data

US 2008/0010550 A1   Jan. 10, 2008

(51) Int. Cl.
*G06F 11/00* (2006.01)
(52) U.S. Cl. ........................................... 714/45; 714/38
(58) Field of Classification Search ............... 714/38, 714/45
See application file for complete search history.

(56) References Cited

U.S. PATENT DOCUMENTS

2002/0055830 A1*  5/2002  Swoboda et al. .............. 703/19
2002/0111785 A1*  8/2002  Swoboda et al. .............. 703/28

* cited by examiner

*Primary Examiner*—Robert Beausoliel
*Assistant Examiner*—Charles Ehne
(74) *Attorney, Agent, or Firm*—Mirna G. Abyad; Wade J. Brady, III; Frederick J. Telecky, Jr.

(57) ABSTRACT

A system comprising a processor core adapted to execute software code and a trace logic coupled to the processor core and comprising a storage. The storage comprises at least one bit that indicates a condition and status information. The trace logic generates a trace information stream associated with the processor core as the core executes the software code. If the condition is satisfied, the trace logic adjusts a status of the trace stream in accordance with the status information.

17 Claims, 3 Drawing Sheets

| CONTROL 2 | CONTROL 1 | CONTROL 0 | PC_STOP | PC_START | TIMING_STOP | TIMING_START |
|---|---|---|---|---|---|---|
| | | | | | | |

302 / 304 / 306 / 308 / 310 / 312 / 314

301 / 307 / 210

| CONTROL 2 | CONTROL 1 | CONTROL 0 | PC_STOP | PC_START | TIMING_STOP | TIMING_START |
|---|---|---|---|---|---|---|
| 0 | 0 | 11 | 0 | 1 | 0 | 1 |

302 / 304 / 306 / 308 / 310 / 312 / 314

301 / 307 / 210

| CONTROL 2 | CONTROL 1 | CONTROL 0 | PC_STOP | PC_START | TIMING_STOP | TIMING_START |
|---|---|---|---|---|---|---|
| 1 | 1 | 01 | 1 | 0 | 0 | 1 |

302 / 304 / 306 / 308 / 310 / 312 / 314

301 / 307 / 210

```
                BEGIN_CODE
                    _____
                    _____
                    _____
                BEGIN_LOOP
                    INCREMENT X  ─ 458
              ┌─ IF X=50
         460 ─┤    WRITE TO TRIG REGISTER TO START TRACE
              │        STREAM(S) WITHIN ONE CLOCK CYCLE
              └─ END_IF
  452 ┤       _____
  LOOP   454 ┤_____
         TARGET _____
         CODE _____
              ┌─ IF X=50
         462 ─┤   WRITE TO TRIG REGISTER TO STOP TRACE STREAM(S)
              └─ END_IF
                END_LOOP
                END_CODE
```

EFFICIENT TRACE TRIGGERING

BACKGROUND

A software developer may use debugging software running on a host computer to test and debug an application executed by a processor coupled to the host computer. Trace hardware is used to trace the processor's activity as the processor executes the application. Trigger hardware is used to start and stop the trace hardware's tracing activity. Trigger hardware is generally expensive and inefficient and consumes a considerable amount of hardware real estate.

SUMMARY

The problems noted above are solved in large part by an efficient technique for trace triggering. This technique generally is less hardware-intensive than the commonly-known techniques mentioned above, thereby reducing cost, increasing efficiency and reducing or virtually eliminating the need for additional hardware real estate. An illustrative embodiment of the technique includes a system comprising a processor core adapted to execute software code and a trace logic coupled to the processor core and comprising a storage. The storage comprises at least one bit that indicates a condition and status information. The trace logic generates a trace information stream associated with the processor core as the core executes the software code. If the condition is satisfied, the trace logic adjusts a status of the trace stream in accordance with the status information.

Another illustrative embodiment includes a method comprising generating a trace information stream associated with a processor as the processor executes software code, obtaining conditions and a status indicator from the software code, the conditions associated with the processor and the status indicator associated with the trace information stream. The method also comprises, if the processor meets at least some of the conditions, adjusting a status of the trace information stream in accordance with the status indicator.

Yet another illustrative embodiment includes a system comprising a trace logic adapted to generate a plurality of trace information streams associated with a processor coupled to the trace logic, and a data structure comprising a plurality of condition bits and a plurality of status bits. If the trace logic determines that conditions associated with the condition bits are satisfied, the trace logic activates or deactivates at least some of the trace information streams in accordance with the plurality of status bits.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . . " Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
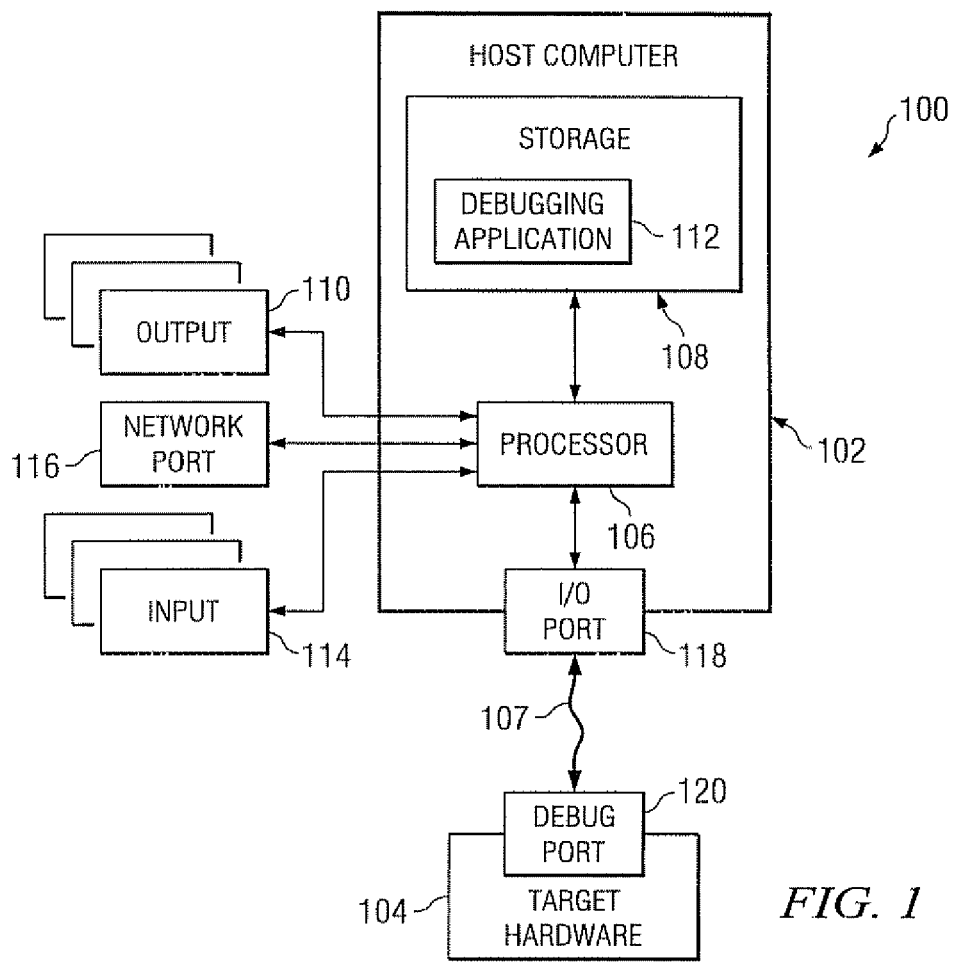
FIG. 1 shows a block diagram of a testing system in accordance with embodiments of the invention.

FIG. 1 shows an illustrative testing system 100 in accordance with embodiments of the invention. The testing system 100 comprises a general purpose host computer 102 and target hardware 104 coupled via a cable 107. The cable 107 couples the input/output (I/O) port 118 of the host computer 102 with the debug port 120 of the target hardware 104. In at least some embodiments, the debug port 120 may include a Joint Test Action Group (JTAG) port, although the scope of disclosure is not limited as such. In some embodiments, the target hardware 104 may be, or may be incorporated into, a mobile communication device such as a mobile phone, a personal digital assistant (e.g., a BLACKBERRY® device), or other type of electronic system. The host computer 102 and the target hardware 104 are now described in turn.

The host computer 102 comprises a processor 106 coupled to the I/O port 118. The processor 106 also couples to a storage medium 108, one or more output devices 110, one or more input devices 114, and a network port 116. The storage medium 108 may comprise volatile memory (e.g., RAM), non-volatile storage such as ROM, a hard disk, a CD-ROM, a flash drive, a floppy disk, a compact disc, and/or combinations thereof. The storage 108 stores a debugging application 112. The input devices 114 may include any one or more of a keyboard, mouse, audio input device, touchpad, etc. The output devices 110 may include any one or more of a display, a printer, a storage device (e.g., a hard drive, flash drive), etc. The processor 106 may use the network port 116 to exchange information with another electronic device communicably coupled to the network port 116, such as another computer on an Internet or intranet network connection. For example, the network port 116 may be used to download the debugging application 112 onto the host computer 102.

The target hardware 104 comprises an electrical device or system that is to be tested by the application 112 running on the host computer 102. The target hardware 104 may comprise an integrated circuit (IC), a plurality of ICs coupled together, a circuit board, etc. The target hardware 104 itself may have a processor that executes software. Under control of the test and debug application 112, the host computer 102 receives information from the target hardware 104. Such information pertains to the operation of the target hardware such as the operation of any software running on the target hardware 104. Such information is usable by a user of the host computer 102 to verify operation of the target hardware and to diagnose any problems that may occur on the target hardware.

Figure 2:
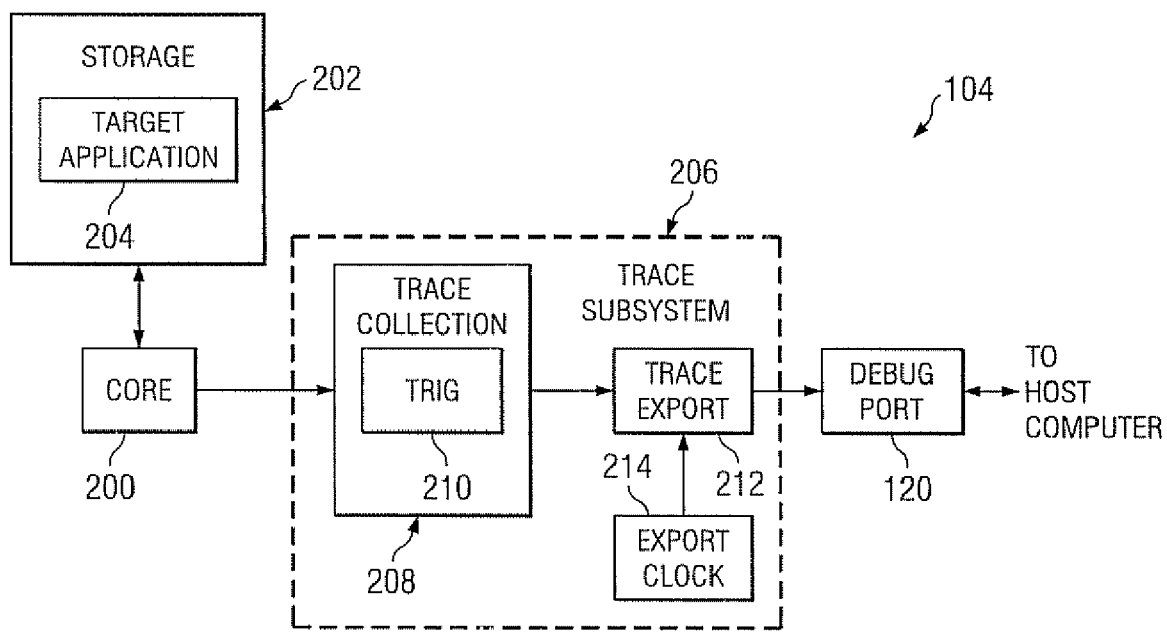
FIG. 2 shows a block diagram of a trace subsystem used in the testing system of FIG. 1, in accordance with preferred embodiments of the invention.

FIG. 2 shows an illustrative block diagram of the target hardware 104. The hardware 104 comprises a processor core 200 coupled to a storage 202 comprising a target application 204. The target application 204 is the application that is tested and/or debugged by the application 112 running on the host computer 102. The target hardware 104 further comprises a trace subsystem 206. The trace subsystem 206 traces the activity of the processor core 200 as the processor core executes the target application 204. By tracing the activity of the processor core as the core executes the application 204, the trace subsystem 206 obtains information useful to a user of the host computer 102 in debugging or diagnosing the target application 204. More specifically, referring to both FIGS. 1 and 2, when the processor 106 executes the debugging application 112, the processor 106 sends signals to and receives signals from the target hardware 104 via the cable 107 and the ports 118 and 120. Signals transferred from the host computer 102 to the target hardware 104 generally comprise test and debug signals, and signals transferred from the target hardware 104 to the computer 102 generally comprise response signals, including trace information. In this way, the target application 204 embedded on the target hardware 104 is tested and debugged using the application 112.

The trace subsystem 206 preferably comprises a trace collection logic 208, a trace export logic 212 and an export clock 214. The trace export logic 212 couples to the debug port 120 which, in turn, couples to the host computer 102 via cable 107 as shown in FIG. 1. The trace collection logic 208 comprises a TRIG register 210 which is used to start and stop the tracing of processor activity by the trace collection logic 208, as described further below.

The trace subsystem 206 receives various types of information that may be of interest to a user of host computer 102 to debug and test the operation of the target hardware 104. Such information may include program counters, timing data, memory read and write access addresses and corresponding data, data handled by application programs, etc. Events pertaining to such information are determined by the processor core 200 and other logic as desired. The trace collection logic 208 records such information. The collected information generally comprises three types of trace information—timing trace information, program counter trace information, and data trace information. These three types of trace information are further described in, for example, U.S. Pat. Pub. No. 2004/0153808, published Aug. 5, 2004 and incorporated herein by reference. The scope of disclosure is not limited to these types of trace information, and other types are possible. For example, trace streams may comprise direct memory access (DMA) trace information, external event trace information, etc.

The trace collection logic 208 also merges together the information from the timing, program counter and data traces and provides the merged trace information to the trace export logic 212. The trace export logic 212, under timing control of export clock 214, provides the merged trace information to the test port 120 for subsequent delivery to the host computer 102.

As mentioned, trace information preferably comprises three separate streams of information: a timing stream, a program counter (PC) stream and a data stream. The timing stream contains various timing information associated with the core 200 as the core executes the target application 204, such as whether the core 200 is active or stalled for each processor clock cycle, etc. The PC stream includes various program counter information associated with the core 200 as the core executes the target application 204, such as how the program counter is affected by exceptions, branches, etc. The data stream includes various data information associated with the core 200 as the core executes the target application 204, such as data values that are accessed by the core 200, etc. In some embodiments, fewer or more information streams may be used.

Each trace stream may either be "active" or "inactive." When a stream is active, information is actively transmitted through the stream from the target hardware 104 to the host computer 102. When a stream is inactive, little or no information is actively transmitted through the stream from the target hardware 104 to the host computer 102. The trace collection logic 208 is capable of activating or inactivating any one or more of the aforementioned trace streams.

Figures 3A, 3B, 3C, 4A:
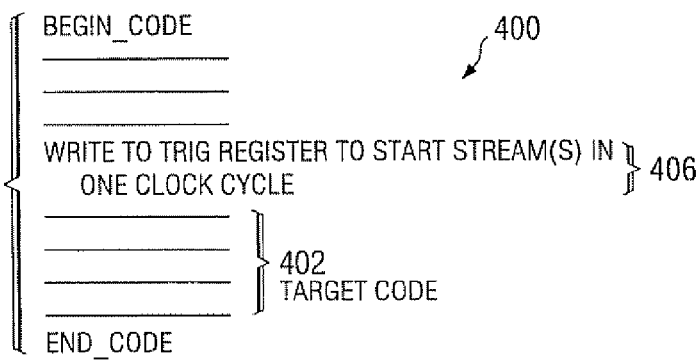
FIGS. 3A-3C show illustrative TRIG registers implemented in the trace subsystem of FIG. 2, in accordance with preferred embodiments of the invention.
FIGS. 4A and 4B depict illustrative techniques by which the TRIG register may be accessed by a software instruction, in accordance with embodiments of the invention.

In accordance with preferred embodiments of the invention, the trace collection logic 208 activates or inactivates each trace stream according to bit values present in the TRIG register 210. FIG. 3A shows an illustrative embodiment of the TRIG register 210. The TRIG register 210 comprises multiple bit fields, each of which is classified as either a conditional field 301 or a status field 307. In the Figure, the bit fields 302, 304 and 306 are shown as conditional fields 301, while bit fields 308, 310, 312 and 314 are shown as status fields 307. The scope of disclosure is not limited to any particular number of bit fields in the TRIG register 210, nor is the scope of disclosure limited to any specific number of bit fields in the conditional fields 301 or the status fields 307.

The status fields 307 specify a desired status of one or more of the trace streams when conditions in the conditional fields 301 are satisfied. Bit field 314 comprises a "TIMING_START" field and bit field 312 comprises a "TIMING_STOP" field. In accordance with a preferred binary scheme, a "1" in the bit field 314 and a "0" in the bit field 312 indicates that the timing trace stream is to be started (activated) when one or more (preferably all) conditions in the conditional fields 301 are satisfied. Likewise, in accordance with the same binary scheme, a "0" in the bit field 314 and a "1" in the bit field 312 indicates that the timing trace stream is to be stopped (inactivated) when one or more (preferably all) conditions in the conditional fields 301 are satisfied. Other binary schemes also may be used. Regardless of the binary scheme used, the bit fields 312 and 314 preferably do not contain the same binary bit.

Similar to the timing bit fields 312 and 314, the TRIG register 210 comprises a "PC_START" bit field 310 and a "PC_STOP" bit field 308. In accordance with the preferred binary scheme, a "1" in the bit field 310 and a "0" in the bit field 308 indicates that the PC trace stream is to be activated when one or more (preferably all) conditions in the conditional fields 301 are satisfied. Likewise, a "0" in the bit field 310 and a "1" in the bit field 308 indicates that the PC stream is to be inactivated when one or more (preferably all) conditions in the conditional fields 301 are satisfied. Although not specifically shown, in some embodiments, the TRIG register 210 also may comprise bit fields which control the activation and inactivation of the data stream.

The bit fields 306, 304 and 302 determine when the status(es) of one or more trace streams is to be adjusted in accordance with the status(es) indicated in the status fields 307. Although any suitable conditions may be inserted into the conditional fields 301, in accordance with preferred embodiments of the invention, bit field 306 indicates a number of clock cycles N (e.g., clock cycles generated by a clock of core 200, not specifically shown) after which the status(es) indicated in the status fields 307 should be enacted. Bit field 304 indicates whether the status(es) indicated in the fields 307 should be enacted after a next branch instruction encountered while executing the target application 204. Bit field 302 indicates whether the status(es) indicated in the fields 307 should be enacted the next time a branch of a branch instruction is "taken" to a portion of the application 204 specified by the branch instruction. Other conditions also are within the scope of disclosure (e.g., when absolute branch instructions, repeat instructions and/or loop instructions are encountered). Each of the bit fields 306, 304 and 302 is now discussed in turn.

The bit field 306 comprises one or more bits that together indicate a number of clock cycles N, counted from the time the processor core 200 writes to the TRIG register 210, after which the trace collection logic 208 should enact the status(es) indicated in the status fields 307. The number N preferably is greater than or equal to 1. The bit field 304 preferably comprises a single binary bit which indicates whether the status(es) indicated in the fields 307 should be enacted after the next branch instruction encountered by the processor core 200 as it executes the application 204. In a preferred binary scheme, if the bit field 304 comprises a "1," the status(es) indicated in the fields 307 are enacted after a next branch instruction is encountered by the core 200. Using the same binary scheme, if the bit field 304 comprises a "0," the status(es) indicated in the fields 307 are not necessarily enacted when the core 200 encounters a next branch instruction. The bit field 302 preferably comprises a single binary bit which indicates whether the status(es) indicated in the fields 307 should be enacted after the core 200 takes a next branch of a branch instruction as it executes the application 204. In a preferred binary scheme, if the bit field 302 comprises a "1," the status(es) indicated in the fields 307 are enacted after the next branch is taken by the core 200. Using the same binary scheme, if the bit field 302 comprises a "0," the status(es) indicated in the fields 307 are not necessarily enacted when the core 200 takes a next branch of a branch instruction. In preferred embodiments, the trace collection logic 208 does not enact the status(es) indicated in the fields 307 unless all conditions in the conditional fields 301 are satisfied. However, in other embodiments, the trace collection logic 208 may enact any one or more of the status(es) indicated in the fields 307 when any one or more of the conditions in the conditional fields 301 are satisfied. The scope of disclosure is not limited to any particular number of conditions that must be satisfied before status(es) indicated in the fields 307 are enacted.

FIG. 3B shows an exemplary implementation of the TRIG register 210. The target application 204 comprises a write instruction (e.g., a MVC instruction) which causes the processor core 200 to write the arguments of the write instruction to the TRIG register 210. At least some of the arguments of the write instruction preferably correspond to one or more of the fields in the TRIG register 210. After the processor core 200 writes to the TRIG register 210, the trace collection logic 208 determines whether any of the conditions specified in the conditional fields 301 have been met. As shown in the Figure, the conditional field 306 comprises a binary sequence "1 1," indicating that the condition of field 306 is met when four clock cycles elapse after the core 200 writes to the TRIG register 210. The field 304 comprises a "0," meaning that the condition associated with the field 304 (e.g., whether a next branch instruction has been encountered by the core 200) is irrelevant to the actions of the logic 208. Likewise, the field 302 comprises a "0," meaning that the condition associated with the field 302 (e.g., whether a branch is taken from a next branch instruction) also is irrelevant to the actions of the logic 208.

After four clock cycles elapse from the time the core 200 writes to the TRIG register 210, the trace collection logic 208 either activates or inactivates the trace streams as indicated in the fields 307. As shown, the bit field 314 comprises a "1" and the bit field 312 comprises a "0," meaning that after the four clock cycles elapse, the trace collection logic 208 may activate the timing stream. Also as shown, the bit field 310 comprises a "1" and the bit field 308 comprises a "0," meaning that after the four clock cycles elapse, the logic 208 may also activate the PC stream.

FIG. 3C shows another illustrative implementation of the TRIG register 210. The field 306 comprises a binary sequence "0 1," indicating that at least one clock cycle should elapse from the time the core 200 writes to the register 210 before the logic 208 adjusts the trace stream status(es) as indicated in fields 307. Further, field 304 comprises a "1," which indicates that the core 200 should encounter a next branch instruction while executing the target application 204 before the logic 208 adjusts the trace stream status(es) as indicated in fields 307. Further still, field 302 also comprises a "1," which indicates that the core 200 should take the next branch instruction in the target application 204 before the logic 208 adjusts the trace stream status(es) as indicated in fields 307. In some embodiments, when the trace collection logic 208 determines that all three of these conditions have been met, the logic 208 adjusts the status(es) of the trace streams as indicated in field 307. Specifically, because the bit field 314 comprises a "1" and the field 312 comprises a "0," the logic 208 activates the timing stream, if it is not already active. Further, because the bit field 310 comprises a "0" and the field 308 comprises a "1," the logic 208 inactivates the PC stream, if it is not already inactive. In other embodiments, the logic 208 adjusts the trace stream status(es) when only some of the conditions have been met.

FIG. 4A shows an illustrative implementation of the TRIG register 210. In particular, FIG. 4A shows (in pseudocode format) a portion of software code 400 embedded in the target application 204. The code 400 comprises a plurality of code lines. A first code line, BEGIN_CODE, marks the beginning of the code 400, and a last code line, END_CODE, marks the end of the code 400. The code 400 comprises target code 402 which a user desires to trace using the system 100 of FIG. 1. Accordingly, the user may insert a write instruction 406 (e.g., a MVC instruction) which, when executed by the core 200, causes the core 200 to write the arguments associated with the instruction 406 to the TRIG register 210. For example, because the target code 402 appears immediately after the instruction 406, the only condition in the TRIG register 210 may be that a single clock cycle elapses before the PC and timing trace streams are activated. In this way, the logic 208 begins tracing the target code 402 and providing the trace streams to the host computer 102 via debug port 120.

Figures 4B, 5:
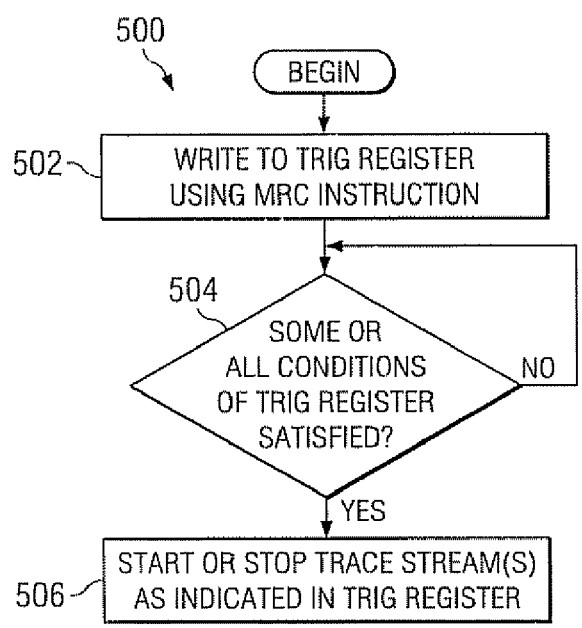
FIG. 5 shows a flow diagram of a method implemented in accordance with preferred embodiments of the invention.

FIG. 4B shows another illustrative implementation of the TRIG register 210. Specifically, FIG. 4B shows (in pseudocode format) a portion of software code 450 embedded in the target application 204. The code 450 comprises a plurality of code lines. The code 450 also comprises a loop 452. In this example, the user desires to trace target code 454 only after the loop has been executed 50 times. Accordingly, the loop 452 comprises an increment instruction 458 that causes the core 200 to increment a variable "X" each time the loop 452 is executed. The loop 452 comprises a conditional statement 460 which causes the core 200 to write to the TRIG register 210 to activate one or more trace streams if the loop 452 has been executed 50 times. Assuming the loop has been executed 50 times, the core 200 writes conditional bits and status bits to the TRIG register 210 such that trace streams are activated in time (e.g., within one clock cycle) to trace the target code 454. After the target code 454 has been executed and traced, a second conditional statement 462 causes the core 200 to write to the TRIG register 210 to inactivate the trace streams. In this way, the TRIG register 210 is used to perform "on-the-fly" triggering of one or more trace streams.

FIG. 5 shows a flow diagram of a method 500 implemented in accordance with embodiments of the invention. The method 500 begins by writing conditional bits and/or status bits to the TRIG register 210 using, for instance, an MVC instruction (block 502). The method 500 then comprises determining whether some or all conditions of the TRIG register 210 have been satisfied (block 504). Whether it is necessary for only some of the conditions to be satisfied or for all of the conditions to be satisfied may vary between implementations. If the appropriate condition(s) have not been satisfied, the method 500 comprises returning to block 504. If the appropriate condition(s) have been satisfied, the method 500 comprises starting or stopping trace stream(s) as indicated in the TRIG register 210 (block 506).

The scope of disclosure is not limited to the views described above. Numerous variations and modifications will become apparent to those skilled in the art once the above disclosure is fully appreciated. It is intended that the following claims be interpreted to embrace all such variations and modifications.

What is claimed is:

1. A system, comprising:
   a processor core adapted to execute software code; and
   a trace logic coupled to the processor core and comprising a storage, said storage comprising at least one bit that indicates a condition and status information;
   wherein the trace logic generates a trace information stream associated with said processor core as the core executes said software code;
   wherein, if the condition is satisfied, the trace logic adjusts a status of the trace stream in accordance with said status and information; and
   wherein the core writes said condition to said storage, and wherein the condition requires that a number of clock cycles elapse from the time the core writes the condition to said storage before the trace logic adjusts the status of the trace stream.

2. The system of claim 1, wherein the trace logic adjusts said status of the trace stream by activating or deactivating the trace stream.

3. The system of claim 2, wherein said trace stream is selected from the group consisting of a program counter trace stream, a timing trace stream and a data trace stream.

4. The system of claim 2, wherein said trace stream is selected from the group consisting of a direct memory access (DMA) trace stream and an external event trace stream.

5. The system of claim 1, wherein the software code comprises an instruction which, when executed by the core, causes the core to write said bit to the storage, said bit associated with one or more arguments of the instruction.

6. The system of claim 1, wherein the core writes said condition to said storage, and wherein the condition requires that the core encounter a branch instruction after writing said condition to said storage.

7. The system of claim 6, wherein the condition further requires that the core branch to a portion of said software code specified by the branch instruction.

8. A method, comprising:
   generating a trace information stream associated with a processor as the processor executes software code;
   obtaining a condition and a status indicator from said software code, said conditions associated with the processor and said status indicator associated with said trace information stream; and
   if the processor meets at least some of said conditions, adjusting a status of the trace information stream in accordance with said status indicator, wherein adjusting said status comprises adjusting the status if a predetermined number of clock cycles elapse after the processor writes the conditions and the status indicator to a storage coupled to the processor.

9. The method of claim 8, wherein adjusting said status comprises either activating or deactivating said trace information stream.

10. The method of claim 9, wherein activating or deactivating said trace information stream comprises activating or deactivating a trace information stream selected from the group consisting of a program counter trace stream, a timing trace stream and a data trace stream.

11. The method of claim 8, wherein obtaining said conditions and the status indicator comprises:
    executing a software instruction containing the conditions and the status indicator as arguments; and
    writing said conditions and status indicator to a storage coupled to the processor.

12. The method of claim 8, wherein adjusting said status comprises adjusting the status if the processor encounters a branch instruction in the software code after writing the conditions and the status indicator to a storage coupled to the processor.

13. The method of claim 8, wherein at least one of said conditions is associated with an instruction selected from the group consisting of an absolute branch instruction, a repeat instruction and a loop instruction.

14. A system, comprising:
    a trace logic adapted to generate a plurality of trace information streams associated with a processor coupled to the trace logic; and
    a data structure comprising a plurality of condition bits and a plurality of status bits;
    wherein, if the trace logic determines that conditions associated with said condition bits are satisfied, the trace logic activates or deactivates at least some of said trace information streams in accordance with said plurality of status bits, wherein the processor writes said conditions to the data structure, and wherein the conditions require that a number of clock cycles elapse after the processor writes said conditions to the data structure.

15. The system of claim 14, wherein said trace information streams are selected from the group consisting of program counter trace streams, data trace streams and timing trace streams.

16. The system of claim 14, wherein the processor writes said conditions to the data structure, and wherein the processor processes a branch instruction after the processor writes said conditions to the data structure and before the trace logic activates or deactivates the at least some of said trace information streams.

17. The system of claim 16, wherein the conditions require that the processor branch to a location in said software code specified by the branch instruction.

* * * * *